United States Patent [19]

Kurosu et al.

[11] Patent Number: 5,048,101

[45] Date of Patent: Sep. 10, 1991

[54] ELECTRONIC FILING DEVICE

[75] Inventors: Yasuo Kurosu, Yokohama; Koichi Okazawa, Tokyo; Yoshihiro Yokoyama; Hiroaki Aotsu, both of Yokohama; Hidefumi Masuzaki, Odawara, all of Japan

[73] Assignee: Hitachi, Ltd., Tokyo, Japan

[21] Appl. No.: 411,268

[22] Filed: Sep. 25, 1989

Related U.S. Application Data

[63] Continuation of Ser. No. 186,162, Apr. 26, 1988, abandoned.

[30] Foreign Application Priority Data

Apr., 1987 [JP] Japan .................................. 62/107599

[51] Int. Cl.$^5$ .............................................. G06K 9/36
[52] U.S. Cl. ........................................ 382/41; 382/47; 358/451
[58] Field of Search ....................... 382/44, 47, 48, 41; 358/151, 450, 451, 452, 903

[56] References Cited

U.S. PATENT DOCUMENTS

| | | | |
|---|---|---|---|
| 3,976,982 | 8/1976 | Eiselen | 382/44 |
| 4,633,503 | 12/1986 | Hinman | 358/451 |
| 4,675,908 | 6/1987 | Saito et al. | 382/47 |
| 4,750,212 | 6/1988 | Yokomizo | 382/44 |
| 4,872,064 | 10/1989 | Tutt et al. | 358/451 |

Primary Examiner—David K. Moore
Assistant Examiner—Yon Jung
Attorney, Agent, or Firm—Antonelli, Terry, Stout & Kraus

[57] ABSTRACT

An electronic filing device, comprising an electronic computer such as a personal computer and an image processing device, in which the electronic computer is provided with a data port and a video port and controls the image processing device by using commands and data given to the image processing device by the electronic computer through the data port and image information outputted by the electronic computer through the video port is enlarged within the image processing device, synthesized with image data searched by the image processing device, and displayed on a display device in the image processing device.

22 Claims, 6 Drawing Sheets

| A | B | C | D | E | F |
|---|---|---|---|---|---|
| G | H | I | J | K | L |
| M | N | O | P | Q | R |
| S | T | U | V | W | X |
| Y | Z | 0 | 1 | 2 | 3 |
| 4 | 5 | 6 | 7 | 8 | 9 |

21

(b)

| A | B | C | D | E | F |
|---|---|---|---|---|---|
| A | B | C | D | E | F |
| G | H | I | J | K | L |
| M | N | O | P | Q | R |
| M | N | O | P | Q | R |
| S | T | U | V | W | X |
| Y | Z | 0 | 1 | 2 | 3 |
| Y | Z | 0 | 1 | 2 | 3 |
| 4 | 5 | 6 | 7 | 8 | 9 |

22

(c)

| A | AB | B | C | CD | D | E | EF | F |
|---|----|---|---|----|---|---|----|---|
| A | AB | B | C | CD | D | E | EF | F |
| G | GH | H | I | IJ | J | K | KL | L |
| M | MN | N | O | OP | P | Q | QR | R |
| M | MN | N | O | OP | P | Q | QR | R |
| S | ST | T | U | UV | V | W | WX | X |
| Y | YZ | Z | 0 | 01 | 1 | 2 | 23 | 3 |
| Y | YZ | Z | 0 | 01 | 1 | 2 | 23 | 3 |
| 4 | 45 | 5 | 6 | 67 | 7 | 8 | 89 | 9 |

23

ELECTRONIC FILING DEVICE

This application is a continuation of application Ser. No. 186,162, filed Apr. 26, 1988 now abandoned.

BACKGROUND OF THE INVENTION

This invention relates to an electronic filing device and in particular to an electronic filing device, which is suitable for synthesizing and displaying an image by a personal computer, etc. on a high resolution CRT device for image data display.

An electronic filing device is a device, which scans a drawing or a document with means such as a photoelectric transforming device, etc.; accumulates obtained image data in an optical disk, etc.; and outputs them to a CRT, a printer, etc. or needed. It is found that the control section of most of these kind of devices is provided with a microprocessor for universal use and has the same construction as a usual personal computer or a workstation. For this reason, in the present situation it is strongly desired to realize a usual workstation, i.e. table calculation or word processing function with an electronic filing device, when it is not used as an electronic filing device.

Therefore a prior art device is so constructed that, as discussed in "Office Work Control", Vol. 25, No. 3 (1986) pp 23-28, in order to realize a multi-functional electronic filing device, the electronic filing device is connected on-line or off-line to a personal computer and the former is in charge of the processing function of the image data, while the latter is in charge of the extension function of the former. Here the extension function is one, which has been realized heretofore by a personal computer, such as a table calculation or a word processing function, etc. Further the word "on-line" means a configuration of various electronic devices connected according to a communication type such as RS232C, token ring LAN, etc., while the "off-line" indicates a configuration, by which information is exchanged through a medium such as a floppy disk, etc.

As described above, in a prior art device, in order to realize the multifunction, the electronic filing device and the personal computer are neither modified from the point of view of hardware nor from the point of view of software. For this reason the method, by which the electronic filing device is connected to a personal computer, is widely spread as an extremely realistic method.

On the other hand, apart from the electronic filing device, directing attention to the method for displaying images on the screen of a CRT, a prior art device disclosed in Japanese Patent Unexamined Publication No. 59-105682 is known. This device superimposes an image inputted by a television camera on an image on a CRT from a computer, etc. to display them, The device is composed of a video RAM capable of storing image data of the two systems, an OR circuit synthesizing these outputs and a group of control circuits controlling them.

The work of this device will be briefly explained. At first information coming from the computer, which constitutes most of an image, is stored in a first video RAM. At the same time the signal coming from the television camera, etc. is stored in a second video RAM in synchronism with the fundamental clock of a display system. Next the image signals coming from these two video RAMs are outputted to the CRT through an OR circuit. Finally the two images are displayed and synthesized on the screen of a CRT.

As stated above, the second prior art device can synthesize and display two images on the screen of a CRT with an extremely high efficiency.

According to the first prior art each electronic filing device and personal computer has a CRT exclusively used therefor. Since there are disposed two CRTs displaying different images in one system and the user must pass judgment, while locking at two displays on these two CRTs, it has a problem that the operability thereof is poor. Further it has another problem that the area occupied by the device is large because of the two CRTs. In addition, since the system is so constructed that two microcomputers having similar functions are each is disposed in the electronic filing device and the personal computer system. The electronic filing device is controlled by its microcomputer by using a program different from that of the personal computer, and the electronic filing device and the personal computer are connected with each other through a communication line. The system has an economic problem from the point of view that two microcomputer systems are required in the control system and also from the point of view that different programs have to be separately made for the electronic filing device and for the personal computer system in order to effect a new program processing, which is to be carried out.

The second prior art technique is improved with respect to the first by the fact that image information of the electronic filing device and image information of the personal computer are displayed on one CRT. However, since the resolution power of the high resolution CRT in the electronic filing device and that of the CRT in the personal computer differ significantly from each other, the image information of the personal computer is displayed on the screen of the high resolution CRT as an extremely small image, which gives rise to a problem that the whole image is difficult to see. In addition no measures for enlarging the image of the personal computer were taken.

SUMMARY OF THE INVENTION

The object of this invention is to provide an economical electronic filing device, which is excellent in operability, in which the filing device is directly controlled by an electronic computer such as a personal computer so that image information for the electronic computer is displayed in a high resolution CRT of the filing device.

The electronic filing device related to this invention is an image processing device, which is connected with an electronic computer provided with a data port and a video port for sending and receiving commands and data and for outputting video signals both through the data port and through the video port of the electronic computer, and which comprises image accumulating means for accumulating image data, searching means for searching image data accumulated in the image accumulating means, converting means for converting video signals from the electronic computer into digital video signals having a frequency suitable for use in the image processing device, storage means for storing video signals converted by the converting means, synthesizing means for enlarging an image represented by the video signals stored in the storage means and synthesizing the enlarged image and an image searched by the searching means, and displaying means for displaying an image synthesized by the synthesizing means.

whereby commands and data from the data port of the electronic computer are sent to the searching means and the synthesizing means, without disposing any microcomputer, which effects the control of the whole device, in the image processing device or the filing device as in the prior art device, and image search as well as enlargement and synthesis of the image is effected in response to the commands and the data. In the case where there are differences in the formality, e.g. differences in the number of bits, between the commands and the data for the electronic computer and the commands and the data used for the control within the filing device, and adapter is disposed in the image processing device, through which adapter the commands and the data coming from the electronic computer are transformed into commands and data of a formality suitable for control within the filing device, which are sent to various elements in the device, and at the same time the data coming from the image processing device are transformed into a formality suitable for the processing in the electronic computer and sent thereafter to the electronic computer. According to this invention it is sufficient to develop a program for controlling the electronic filing device only for the electronic computer of the device and further it is possible to display image information from the electronic computer on the screen of the high resolution CRT of the filing device together with an image searched by the filing device the former being enlarged so as to be matched with the latter.

Next the construction and the work of the electronic filing device according to this invention will be explained in detail.

According to this invention there is disposed a personal computer or a workstation having a function similar to that of the control section controlling the whole filing device instead thereof. For this reason there are two ports, through which data are to be exchanged. One of them is a port, through which the personal computer controls the electronic filing device and commands and data are exchanged. This is realized by using communication means, such as I/O ports for universal use, RS232C, etc., already existing in the personal computer. The other of them is a video output for displaying the image. This is realized by constructing the high resolution CRT control circuit with a video signal input section, two video RAMs and an enlarging and synthesizing circuit.

In the filing device an analogue signal is sampled and digitized, and stored thereafter in a video RAM for the display in the personal computer. On the other hand image data may be read out from an optical disk and stored in a video RAM for image data through an image bus line. Finally screen data read out from the video RAM for the display in the personal computer is enlarged to a suitable size and synthesized with the image data by logical operations in the enlarging and synthesizing circuit. Thereafter the data is outputted to the high resolution CRT.

Now an example of the display on the screen constructed by the means described above will be explained, referring to FIGS. 5a and 5b. FIG. 5a illustrates an example representing only the screen of the personal computer and FIG. 5b shows an example representing image data of a document. In order to visibly display the image of the personal computer having a different size and shape on a high resolution CRT 110 for displaying high resolution power image data, the displaying image screen 120 is enlarged and the background 130 is displayed with a color, whose visibility is low, such as black, etc. Further, in the case where the image data is displayed, the image data 150 is displayed by a full page on the high resolution CRT 110 as usual.

In this way, according to this invention, a prior art electronic filing device is used by replacing its control section by an electronic computer for universal use such as a personal computer, etc. and a video signal of the computer for universal use is received by a filing device. Thus it is possible to synthesize and display it together with image data accumulated on an optical disk after having enlarged it. By this method it was made possible to display image data, an image of a personal computer and an image obtained by synthesizing them and to develop softwares without developing softwares exclusively used for the filing device, which were necessary for a prior art electronic filing device. In this way it is made possible to devise or plan to increase significantly the function of the device.

BRIEF DESCRIPTION OF THE DRAWINGS

These and other objects and advantages of the present invention will become apparent by reference to the following description and accompanying drawings wherein:

FIG. 4 is a scheme for explaining the enlargement of an image under the control by the display control section indicated in FIG. 3.

DESCRIPTION OF THE PREFERRED EMBODIMENTS

Before explaining embodiments of this invention an electronic filing device according to prior art will be explained.

Figure 1:
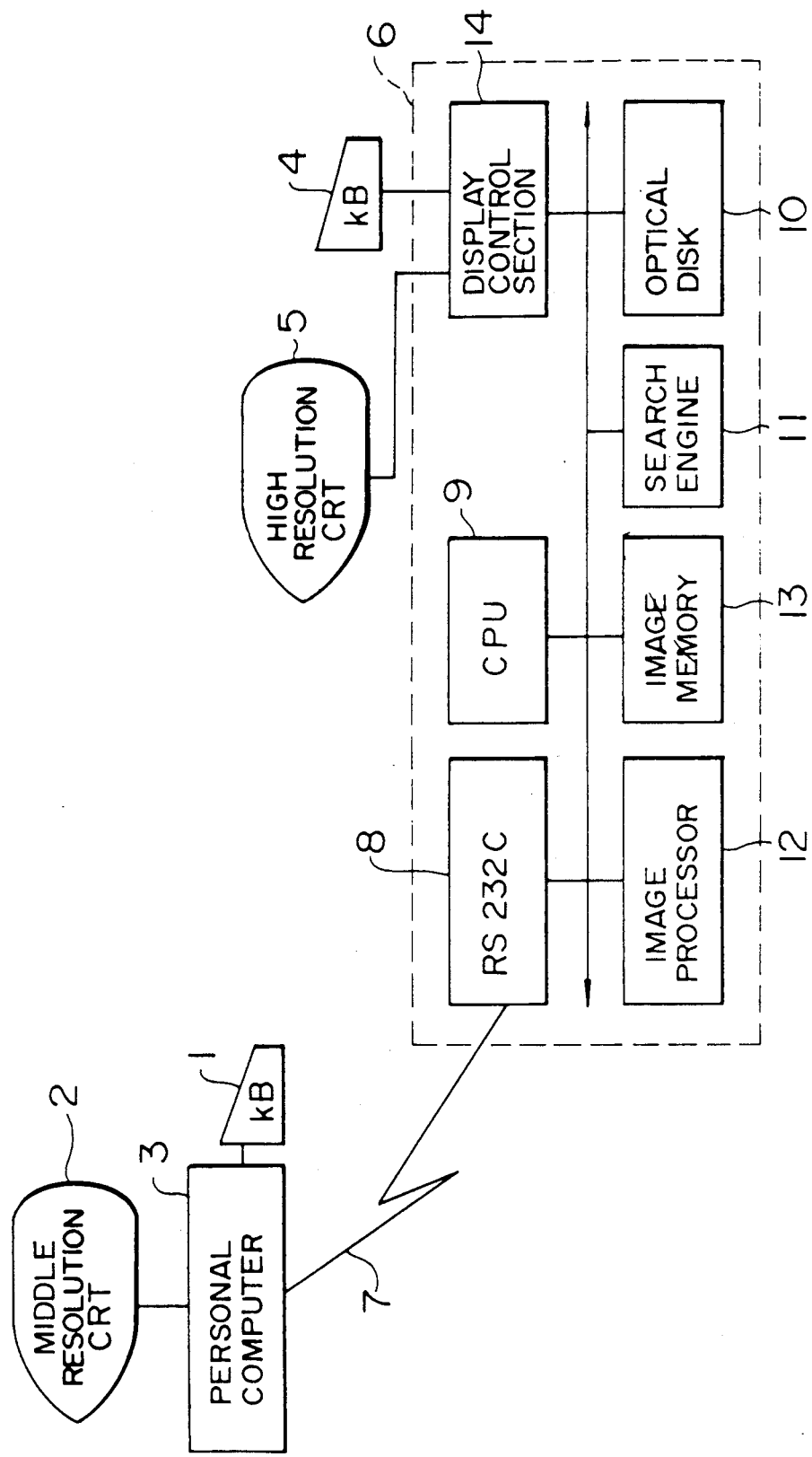
FIG. 1 is a block diagram illustrating a prior art electronic filing device.

FIG. 1 illustrate the construction of an example of a prior art electronic filing device. In FIG. 1 the electronic filing device consists of a personal computer 3 provided with a key board 1 and a middle resolution CRT 2 and a filing device 6 provided with a key board 4 and a high resolution CRT 5 and the personal computer 3 and the filing device 6 are connected through a communication line 7. The filing device 6 includes a communication section RS232C 8; a CPU 9 for controlling the whole filling device; an optical disk 10 accumulating a large amount of image data; a search engine 11 searching an image accumulated in the optical disk 10, responding to commands from the CPU 9; an image processor 12 effecting compression and extension of image data read out from the optical disk 10; an image memory 13, which is a memory conserving temporarily image data, e.g. which is used for various purposes such as temporary conservation of original image data, in the case where the image is rotated or treated to be reduced; and a display control section 14 effecting the control for displaying the image data coming from the optical disk 10 or the image processor 12 in a high resolution CRT 5.

In the case where a user sends commands to the personal computer 3 through the key board 1 and desires to display image information within the personal computer 3 and the image data accumulated within the filing device 6, the user instructs the filing device 6 to display the image data by using a communication message from the personal computer 3. In the filing device 6, the image data from the optical disk 10 is searched by a program stored in the filing device under the control by the CPU 9, responding to the communication message, and displayed on the high resolution CRT 5, while the image data within the personal computer 3 is displayed on the middle resolution CRT 2. The key board 4 of the filing device 6 is used for the commands by the user, in the case where search and display of the image data are effected in the filing device alone.

In the electronic filing device indicated in FIG. 1 different programs were necessary for controlling the personal computer 3 and the filing device 6 and when it was desired to introduce a new program in the whole electronic filing device, it was obliged to develop programs separately for the personal computer 3 and the filing device 6. Further the CPU 9 and RS232C 8 were necessary for the filing device 6 and therefore there was a problem that the quantity of hardwares was increased for the whole device. Furthermore, since the user had to see two CRTs, i.e. the middle resolution CRT and the high resolution CRT, there was a problem that the operability thereof was poor.

The present invention has been made in order to resolve the problems described above of the prior art. Now an embodiment of the electronic filing device according to the present invention will be explained below.

Figure 2:
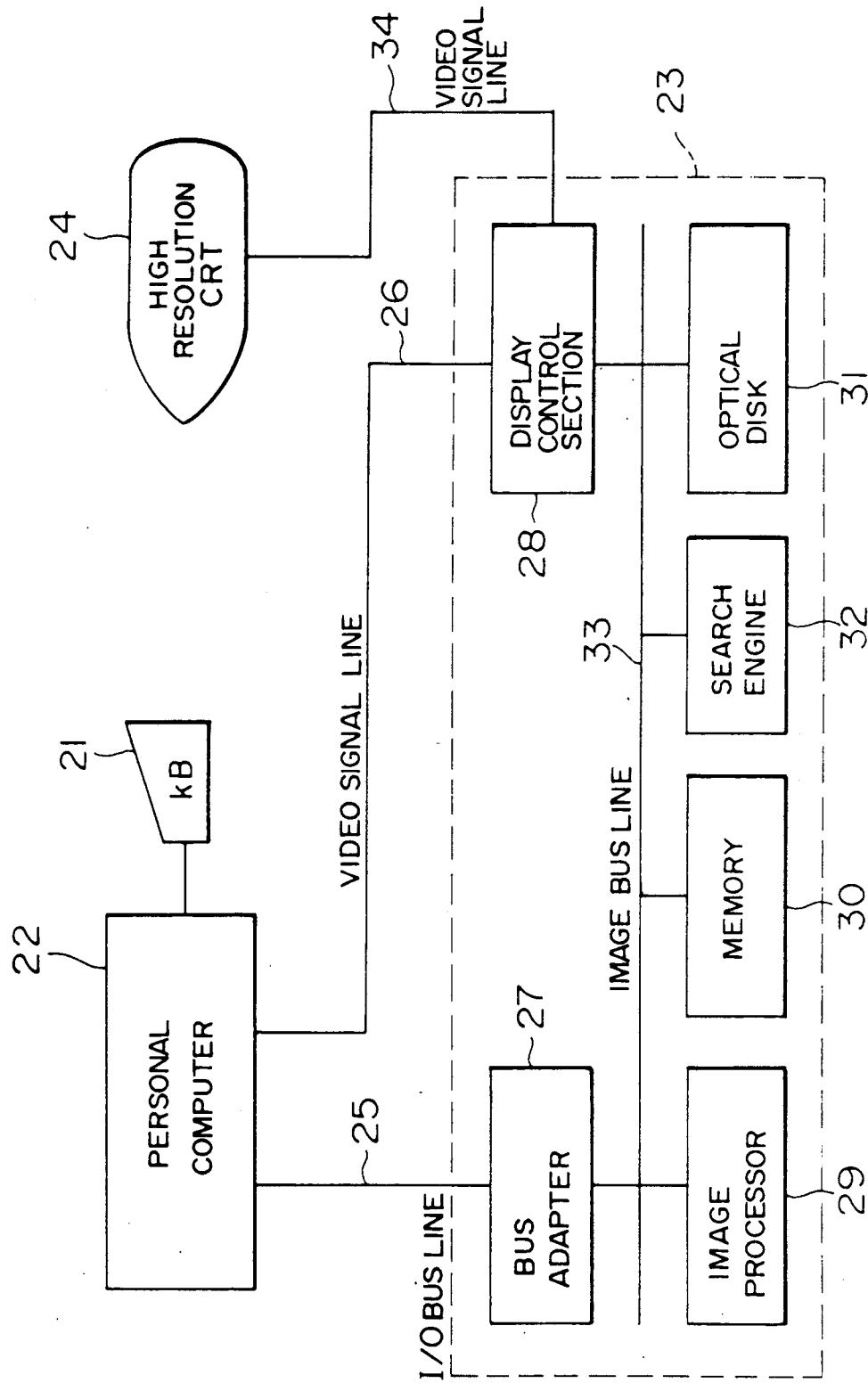
FIG. 2 is a block diagram illustrating an embodiment of the electronic filing device according to this invention.

FIG. 2 is a block diagram illustrating the construction of an embodiment of the present invention.

The system indicated in FIG. 2 consists of a personal computer 22 provided with a key board 21 and taking charge of the control of the whole system, an image processing section 23 taking charge of the filing function, and a high resolution CRT 24. The key board 21 is used, in the case where the user commands an image display to the personal computer, etc. Commands and data from the personal computer 22 are transmitted to the image processing section 23 through an I/O bus line 25. Image signals representing the image on the screen of the personal computer 22 are transmitted to the image processing section 23 through a video signal line 26.

The image processing section 23 includes a bus adapter 27, a display control section 28, an image processor 29, a memory 30, an optical disk 31 and a search engine 32 and the transmission of a great amount of image data between various devices is effected through an image bus line 33.

Thus bus adapter 27 is disposed for exchanging data between the I/O bus line 25 and the image bus line 33. That is, the adapter 27 transforms the formality of commands and data so as to match it to the respective destination device in the transmission of commands and data from the personal computer 22 to the image processing section 23 and in the transmission of data from the image processing section 23 to the personal computer 22. For example, in the case where the number of bits in the data bus in the personal computer differs from that in the image processing section, addition or deletion of bits is effected and in the case where the matching cannot be settled by simple addition or deletion, the transformation of the formality of data is effected by means of a small microcomputer. The display control section 28 constitutes synthesizing means for realizing this invention makes the CRT display the image in the personal computer 22 and the image data inputted through the image bus line 33, superimposing them on each other. The output of the display control section 28 is transmitted to the high resolution CRT 24 through a video signal line 34. The image processor 29 carries out compression, extension, enlargement, reduction, transmission, etc. of the image data. The memory 30 accumulates temporarily the image data and the optical disk 31 accumulates permanently a large amount of image data. The search engine 32 is means for searching the image data specified by a command from the optical disk 31, responding to a command given by a personal computer 22 through the bus adapter 27 and the image bus line 33 and the image data found by the search are sent to the image processor 29 or the display control section 28. The search engine 32 and the image processor 29 constitutes a searching portion in the image processing section 23. Image data such as images, etc. are accumulated in the optical disk 31 after having been subjected to necessary elaborating processing. Although a part of description concerning a printer, a scanner, etc. is omitted in the figure for the sake of simplicity of explanation, this gives rise to no hindrance to understand the essential point of the present invention.

Figure 5A:
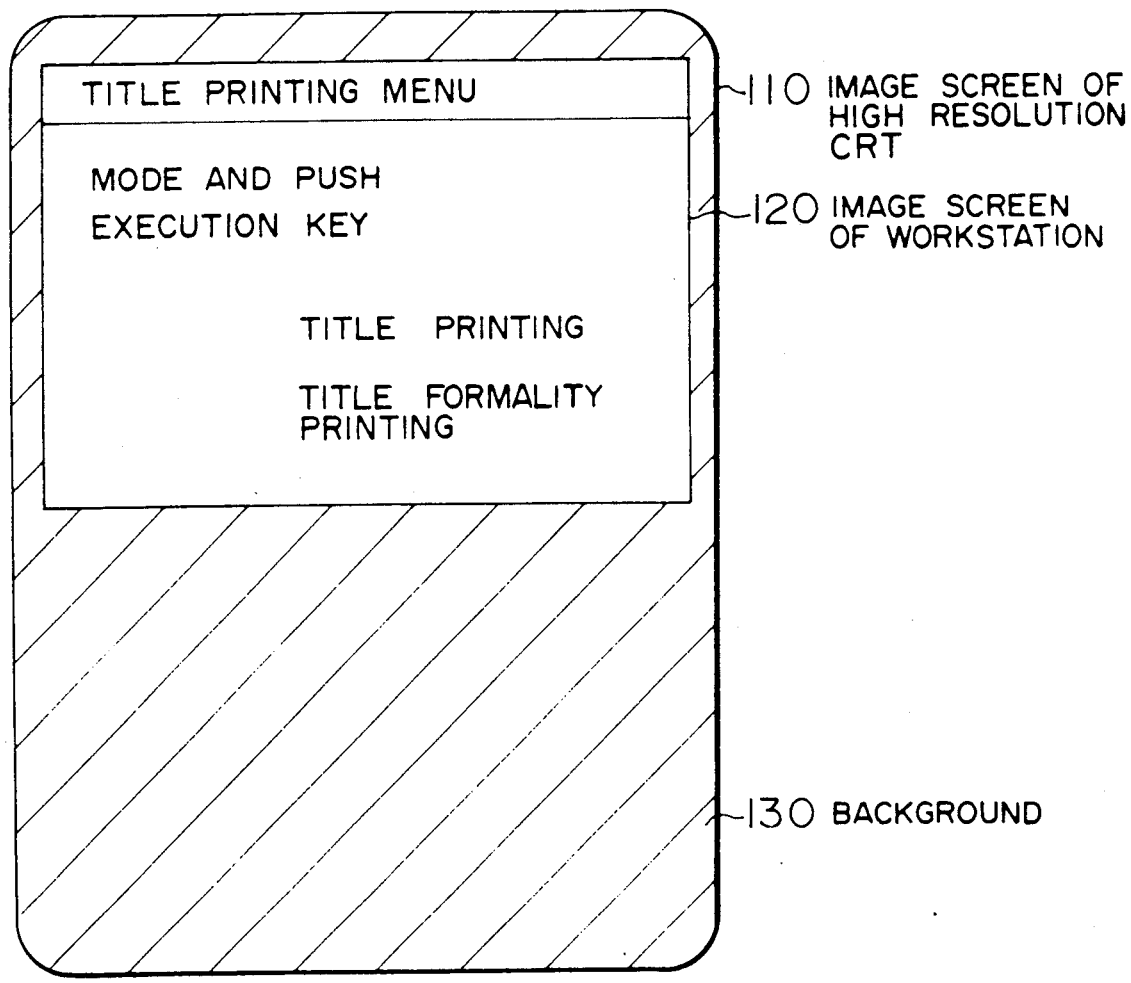
FIGS. 5a and 5b show examples of the display on a CRT in the electronic filing device according to this invention.
Figure 5B:
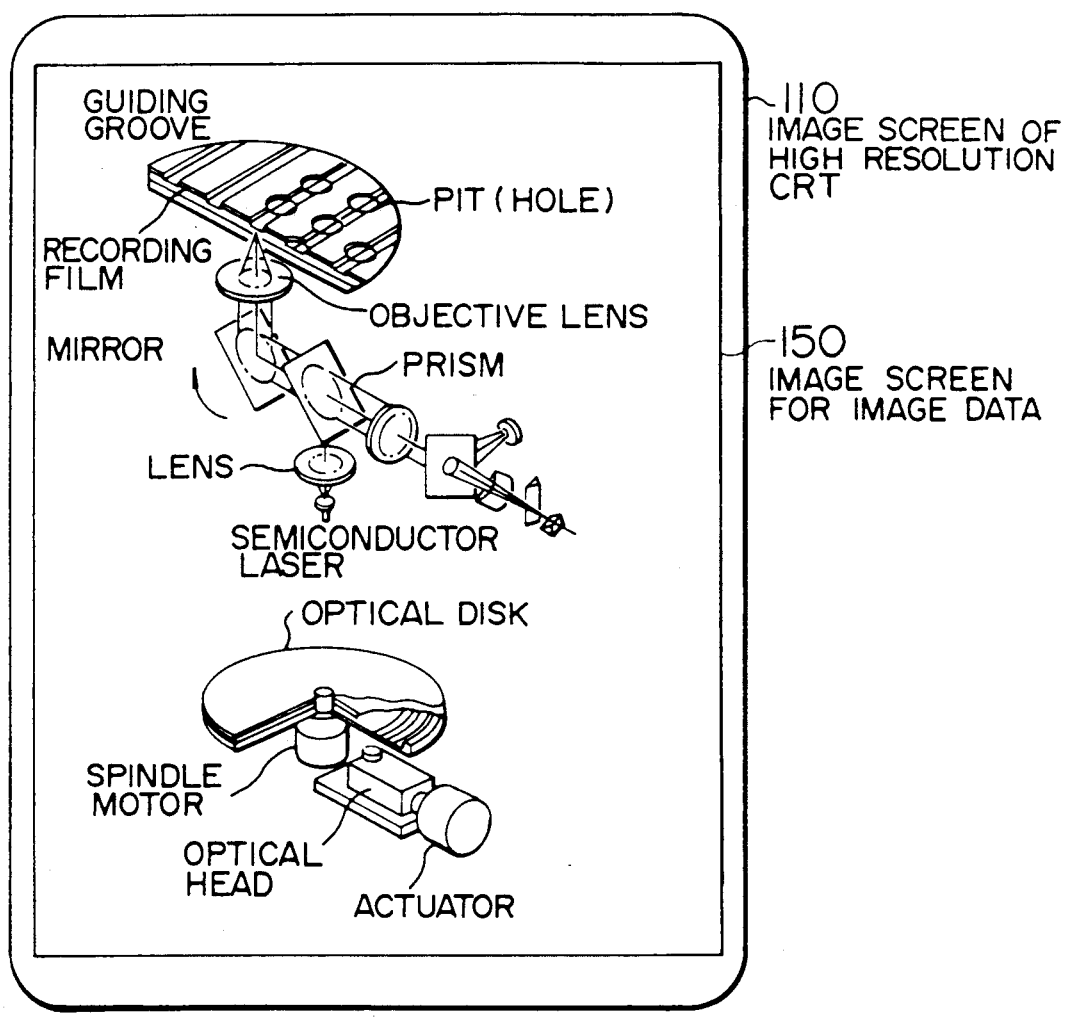

Now the work of this embodiment will be explained. As soon as software on the market such as word processing, table calculation, etc. begins to work in the personal computer 22, the personal computer 22 transmits parameters for setting the image of the high resolution CRT 24 to the image processing section 23 through the I/O bus line 25. That is, the parameters for deciding the position and the size of the window of the personal computer displayed on the high resolution CRT 24 are set in a register of the display control section 28. The display control section 28, in which the parameters are set, opens a window for the image of a personal computer 22 at the specified area on the high resolution CRT 24. On the other hand, in order to indicate the whole surface outside of the window in dark, the personal computer 22 gives the image processor 29 a command and writes FFFF in a bit map memory on the image bus space. In this way the conditions, under which the software on the market can be operated, are fulfilled and where the video signal of the personal computer 22 is inputted, the image indicated in FIG. 5a is displayed on the high resolution CRT 24 according to the operation of the display control section 28.

Figure 3:
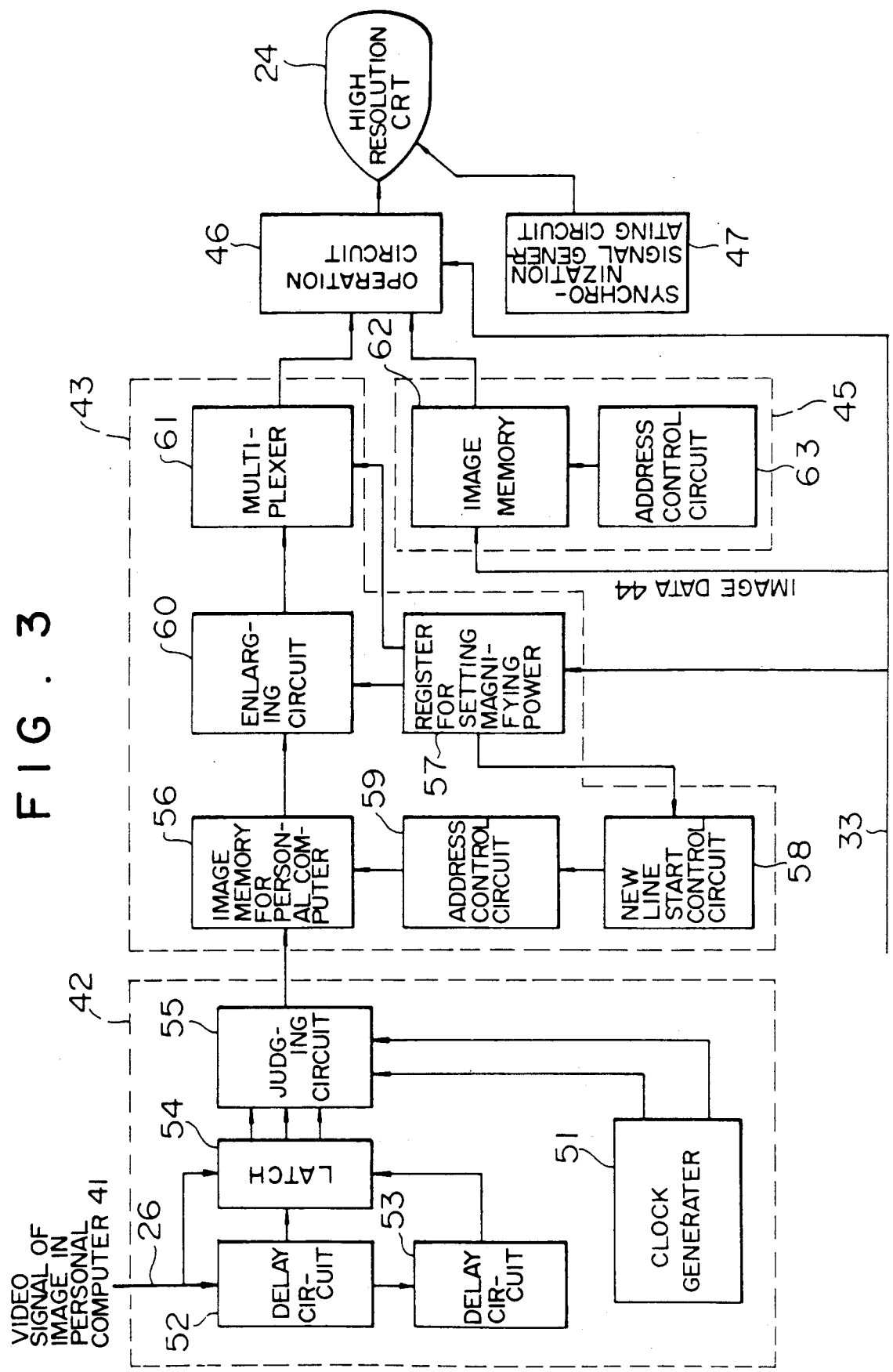
FIG. 3 is a block diagram illustrating the display control section in the electronic filing device indicated in FIG. 2.

FIG. 3 is a block diagram illustrating the display control section 28 in detail.

The display control section 28 includes a video signal converting circuit 42, a bit map memory 43 with enlarging function, an operating circuit 46 and a synchronization signal generating circuit 47.

The video signal converting circuit 42 receives the video signal 41 sent asynchronously with the clock of the display control section 28 from the personal computer 22 through the video signal line 26 and digitizes it. The bit map memory 43 with enlarging function stores temporarily data corresponding to an image of the personal computer 22 and enlarges the size thereof. The bit map memory 45 for image receives the image data 44 through the image bus line 33 and stores temporarily the image data corresponding to an image. The operation circuit 46 synthesizes the outputs read out from the two bit map memories. The synchronization signal generating circuit 47 generates the horizontal synchronization signal, the vertical synchronization signal, etc. given to the high resolution CRT 24.

The video signal converting circuit 42 includes a clock generator 51, delay circuits 52 and 53, a latch 54 and a judging circuit 55.

The clock generator 51 generates two kinds of clocks having a duty circle 25% and different phases. The delay circuit 52 delays the phase of the video signal 41 coming from the personal computer 22 by ⅛ period and the delay circuit 53 delays it further by ⅛ period. The latch 54 takes-in three kinds of video signals by using the fundamental clock generated by the clock generator. Receiving these three kinds of video signals taken-in by the latch 54, the judging circuit 55 judges the behavior of the video signal with respect to the fundamental clock. On the basis of the result of this judgment the fundamental clock is selected between the two kinds of clocks generated by the clock generator 51. The construction of the judging circuit 55 is identical to the synchronizing circuit for the video signal and the sampling clock indicated in Japanese Patent Application No. 62-102625.

The bit map memory 43 with enlarging function includes an image memory 56 for the personal computer, a register 57 for setting the magnifying power, a new line start control circuit 58, an address control circuit 59, an enlarging circuit 60 and a multiplexer 61.

The image memory 56 for the personal computer stores temporarily the image for the personal computer 22, which is digitized by the video signal converting circuit 52. The register 57 for setting the magnifying power stores the magnifying power, which compensates the difference between the resolutions of CRT (not used for this invention) of the personal computer 22 and that of the high resolution CRT 24. Usually the size of the image of the personal computer is 1000×600 dots and the resolving power thereof is about 100 dots per inch. On the other hand the size of the image of the filing device is usually 1700×2400 dots, in order to display image data of A4 full size and the resolving power thereof 200 dots per inch. In order to display the image coming from the personal computer 22 on the screen of the high resolution CRT 8 with a good man-machine property, the difference in the resolving power is compensated by matching it with the image data in the image processing section 23.

The new line start control circuit 58 controls the longitudinal enlargement according to a command from the register 57 for setting the magnifying power. The address control circuit 59 generates addresses for the image memory 56 for the personal computer according to a command from the new line start control circuit 58. The enlarging circuit 60 controls the transversal enlargement according to a command of the register 57 for setting the magnifying power. The setting of the magnifying power to the register 57 for setting the magnifying power is effected by setting data indicating the magnifying power from the personal computer through the bus adapter 27 and the image bus line 33. The longitudinal enlargement is effected by changing periodically the number of new line starts of the horizontal scanning for reading out image data from the image memory 56 and performing periodical raster interpolation and on the other hand the transversal enlargement is effected by interpolating periodically parallel output data read out from the image memory 56.

FIG. 4 illustrates an example of the image, in the case where the image is enlarged both in the longitudinal and the transversal directions. FIG. 4(a) indicates an image which is not yet enlarged. A to Z and 0 to 9 in the figure represent each one dot, respectively and each of them indicates either one of the states where there is a dot, "1", and there is no dot, "0". In FIG. 4, in order to simplify the explanation, the size is enlarged by a factor of 1.5 both in the longitudinal and the transversal direction. In the case where it is instructed in the register 37 for setting the magnifying power to enlarge the display by a factor of 1.5 both in the longitudinal and the transversal directions, since the new line start control circuit 58 specifies numbers of new line starts 0 and 1 in the horizontal scanning alternately for every scanning. the data in the image memory 56 are read out, as indicated in FIG. 4(b). In this case, in FIG 4(b), the image is enlarged by a factor of 2 in the longitudinal direction at the places, where the same pixel line appears successively, and the size is enlarged by a factor of 1.5 in the whole in the longitudinal direction. For the parallel output data read out, as indicated in FIG. 4(b), the enlarging circuit 60 inserts e.g. a dot AB, which is a logical product of the dots A and B therebetween. When a case where dot A and B is 1 and the dot B is 0 is considered, the dot AB is 0. That is, the dot B is magnified by 2 and the whole is magnified by 1.5.

The multiplexer 61 converts the output data of the enlarging circuit 60 into those having a bit length according to the specification of the operating circuit 46.

The bit map memory 45 for image includes an image memory 62 storing temporarily the image data 44 and an address control circuit 63 generating addresses for the image memory 62.

Next the work of the device represented by this block diagram will be explained.

At first a video signal 41 generating the image is inputted from the personal computer 22 to the video signal converting circuit 42. Since this video signal 41 is inputted asynchronously with the fundamental clock of the display control section 28, it is necessary to pull-in it so as to be synchronous with the fundamental clock and to convert it into a digital signal. For this reason, two kinds of clocks having phases, which are opposite to each other, are prepared and three kinds of video signals, whose phases are retarded by ⅛ period from each other, are formed. In this way the three kinds of states of the video signals are judged on the basis of the relation between these video signals and the fundamental clock. When it is judged that the video signals are advanced or retarded, the fundamental clock is changed over to that having the inverse phase and in this way the synchronism between the fundamental clock and the video signals is continuously kept. That is, the clock generator 51 generates two kinds of clocks having a duty cycle of 25%, whose phases are opposite to each other and one of them is decided provisionally to be the fundamental clock. The three kinds of video signals, whose phases differ by ⅛ period from each other, are generated by inputting the video signal 41 of the image in the personal computer in the delay circuits 52 and 53.

Next, the three kinds of video signals are taken in the latch 54 according to the fundamental clock determined previously. Further the phase of the video signals with respect to the fundamental clock is judged by the judging circuit 55. That is, in the case where the fundamental clock is in the stable region of the video signals, all the three kinds of video signals are "1" or "0" and the clock is not changed over. On the contrary, when the fundamental clock is in the unstable region, the three kinds of video signals are mixedly "0" or "1" and the fundamental clock is changed over to the other having the inverse phase.

By such a process the video signal 41 of the image in the personal computer is synchronized and at the same time digitized and thereafter it is inputted in the bit map memory 43 with enlarging function. In this case it is a matter of course that other means such as a PLL (Phase Locked Loop) circuit, etc. may be used for pulling-in in the synchronism.

The digitized video signal is written in the image memory 56 for the personal computer. At the same time the magnifying power and the presence or absence of the interlace control of the image to be displayed are set in the magnifying power setting register 57 and the display starting address is set in the address control circuit 59. The new line start control circuit 58 changes periodically the numbers of new line starts in the horizontal scanning according to the magnification of the display in the vertical direction and the presence or absence of the interlace control set in the magnifying power setting register 57 and instructs the address control circuit 59 thereof. The address control circuit 59 accesses the image memory 56 for the personal computer while controlling the address according to the set display starting address and the number of new line starts in the horizontal scanning specified by the new line start control circuit 58 and reads out the content thereof. The read out data has been enlarged in the vertical direction according to the set magnifying power and at the same time subjected to the interlace/non-interlace control. The read out data are sent to the enlarging circuit 60, where they are enlarged, remaining to be parallel data, according to the magnifying power in the horizontal direction, which is set in the register 57 for setting the magnifying power. Since the enlarged data has a varied data length, it is converted into a data length according to the specification of the operating circuit 46 by the multiplexer 61.

By such a process the data inputted by the video signal converting circuit 42 are subjected to an enlarging processing and inputted in the operation circuit 46 in order to compensate the difference between the resolving power of the CRT of the personal computer 22 and that of the high resolution CRT in the bit map memory 43 with enlarging function.

On the other hand, the image data 44 searched from the optical disk 31 by the search engine 32 according to the command from the personal computer 22 are inputted in the bit map memory 45 for image through the image bus line 33. The inputted image data 44 are written in the image memory 62. At the same time the presence or absence of the interlace control and the display starting address are set in the address control circuit 63. The address control circuit 63 accesses the image memory 62 while controlling the address according to the display starting address and the presence or absence of the interlace control and readout the content thereof. The read out data are inputted in the operation circuit 46 in order to be synthesized with the image data of the personal computer described above.

The operation circuit 46 is a device, in which the function of the arithmetic and logic unit (ALU) in an usual electronic computer is reduced and it effects display of either one of the image from the personal computer and the image accumulated in the image processing device 23, display, by which the two images are crossed or overlapped and only one of them is displayed at the crossing, and display, by which the image of the personal computer is buried in the image of the image processing device, etc. according to commands coming from the personal computer 22 through the adapter 27 and an image bus line 33. In this way the screen data of the personal computer 22 and the image data are synthesized in the operation circuit 46 and inputted in the high resolution CRT 24 together with the horizontal and the vertical synchronization signals. The synthesized image is displayed on the high resolution CRT, depending on the horizontal and the vertical synchronization signals.

In the embodiment indicated in FIG. 2, there are disposed neither CPU for controlling the whole device in the image processing device 23 nor the communicating device, but the control of the image processing device 23 is effected by programs for the personal computer 22. Consequently, in the case where the control of the whole electronic filing device is effected by a new program, it is sufficiently to develop the program only for the personal computer 22. Further it is possible to display the image information of the personal computer 22 on the high resolution CRT 24 in the image processing device 23, after having suitably enlarged it, together with the image of the image processing device 23 and thus to resolve the problems of the prior art.

While particular embodiments of the invention have been shown and described, it will be obvious to those skilled in the art the various changes and modifications may be made without departing from the present invention in its broader aspect.

We claim:

1. An electronic filing device comprising:
an electronic computer provided with a data port for sending and receiving commands and data as well as a video port for outputting video signals; and
an image processing device connected to said electronic computer through said data port and said video port, which includes
storing means for storing image data,
searching means for searching said image data stored in said storing means to obtain image data responding to said commands and data from said electronic computer and for obtaining searched image data,
converting means for converting video signals asynchronously provided from said electronic computer through said video port into digital video signals in synchronous with said image processing device,
storage means for storing said digital video signals converted by said converting means,
synthesizing means connected to said storage means and said searching means for enlarging an image represented by said digital video signals stored in said storage means in response to said data from said electronic computer and synthesizing said digital video signals of said enlarged image and said searched image data obtained by said searching means, and
displaying means for displaying a synthesized image of an enlarged image enlarged by said synthesizing means and a searched image data obtained by said searching means.

2. An electronic filing device comprising:

an electronic computer provided with a data port for sending and receiving commands and data as well as a video port for outputting video signals; and an image processing device connected to said electronic computer through said data port and said video port, which includes storing means for storing image data, searching means for searching said image data stored in said storage means to obtain image data responding to said commands and data from said electronic computer and for obtaining an image, converting means for converting video signals from said electronic computer through said video port into digital video signals suitable for using said image processing device, storage means for storing said digital video signals converted by said converting means, synthesizing means connected to said storage means and said searching means for enlarging an image represented by said digital video signals stored in said storage means and synthesizing said digital video signals of said enlarged image and said image data obtained by said searching means, and displaying means for displaying an output delivered from said synthesizing means;

whereby said synthesizing means enlarges said image represented by said digital video signals from said electronic computer, responding to said data from said electronic computer, and said displaying means displays a synthesized image of an enlarged image enlarged by said synthesizing means and a searched image obtained by said searching means;

wherein said image processing device further includes an adapter for converting said commands and data sent to said image processing device form said electronic computer into commands and data of a form which is suitable for use within said image processing device, and for converting data to be sent to said electronic computer from said image processing device in to data of a form which is suitable for use within said electronic computer.

3. An electronic filing device according to claim 1, wherein said displaying means in said image processing device includes a high resolution CRT.

4. An electronic filing device comprising:

computing means provided with a data port for sending and receiving commands and data as well as a video port for outputting video signals; and an image processing device connected to said computing means through said data port and said video port thereof, which includes accumulating means for accumulating image data, searching means for searching said image data accumulated in said accumulated means in response to said command and data through said data port from said computing means and for obtaining searched image data from said accumulating means, converting means for converting video signals asynchronously supplied from said computing means into digital video signals, in synchronous with said image processing device, storage means for storing said digital video signals converted by said converting means, synthesizing means for enlarging an image represented by said digital video signals readout from said storage means in response to said data from said computing means and synthesizing said digital video signals corresponding to said enlarged image and said image data corresponding to said image obtained by said searching means.

5. An electronic filing device comprising:

computing means provided with a data port for sending and receiving commands and data as well as a video port for outputting video signals; and an image processing device connected to said computing means through said data port and said video port thereof, which includes accumulating means for accumulating image data, searching means for searching said image data accumulated in said accumulating means and for obtaining an image from said accumulated image data, converting means for converting video signals asynchronously supplied form computing means in to digital video signals, in synchronous with said image processing device, storage means for storing said digital video signals converted by said converting means, synthesizing means for enlarging an image represented by said digital video signals readout from said storage means and synthesizing said digital video signals corresponding to said enlarged image and said image data corresponding to said image obtained by said searching means, and displaying means for displaying an image synthesized by said synthesizing means;

whereby said searching means searches said image data accumulated in said accumulating means, responding to said command and data through said data port from said computing means, to send said data representing said image obtained by said searching means to said synthesizing means and said synthesizing means enlarges said image represented by said digital video signals readout from said storage means, responding to said data from said computing means;

wherein said image processing device includes an adapter for converting said commands and data sent to said image processing device from said computing means into commands and data of a form which is suitable for use within said image processing device, and for converting data to be sent to said computing means from said image processing device into data of a form which is suitable for use within said computing means.

6. An electronic filing device according to claim 4, wherein said displaying means in said image processing device includes a high resolution CRT.

7. An electronic filing device comprising:

an electronic computer provided with a data port for sending and receiving commands and data as well as a video port for outputting video signals; and an image processing device connected to said electronic computer through said data port and said video port, which includes storing means for storing image data, searching means for searching said image data stored in said storing means in response to said commands and data sent through said data port form said electronic computer to obtain one of said image data, converting means for converting video signals asynchronously supplied through said video port from said electronic computer into digital video signals in synchronous with a fundamental clock of said image processing device, first storage means for storing said digital video signals converted by said converting means, synthesizing means connected to said searching means and said first storage means, for enlarging an image represented by said digital video signal read out from said first storage means, and for synthesizing said digital video signal of said enlarged image and said image data supplied from said searching means, and displaying means for displaying a synthesized image corresponding to an output of said synthesizing means.

8. An electronic filing device according to claim 7, wherein said searching means includes second storage means for storing said image data searched thereby.

9. An electronic filing device according to claim 7, wherein said synthesizing means includes register means for storing said data sent via said data port from said electronic computer, said data stored in said register means indicating a magnifying power of said synthesizing means.

10. An electronic image filing system based on an image processing device including means for storing image data, means for searching the image data stored in said storing means and means for displaying an image corresponding to the image data searched by the searching means, the system comprising:

an electronic computer provided with a data port for sending and receiving commands and data as well as a video port for outputting video signals;

means for converting video signals output through said video port asynchronously provided from said electronic computer into digital video signal suitable for use in the image processing device;

first buffering means for temporarily storing said digital video signals converted by said converting means;

means connected to said first buffering means for enlarging an image represented by said digital video signals read out from said first buffering means in response to said data sent via said data port form said electronic computer; and means for synthesizing said digital video signals of said enlarged image supplied from said enlarging means and the searched image data supplied from the searching means, an image corresponding to an output of said synthesizing means being displayed by the displaying means.

11. An electronic image filing system according to claim 10, wherein the searching means includes second buffering means for temporarily storing the searched image data.

12. An electronic image filing system according to claim 10, wherein said enlarging means includes register means for storing said data sent via said data port from said electronic computer.

13. An electronic image filing system according to claim 10, wherein said converting means includes means for generating clock pulses and means for synchronizing said digital video signals with said clock pulses.

14. An electronic image filing system according to claim 11, wherein the storing means is an optical disk.

15. Method for synthesizing image in an electronic image filing system including means for storing image data, means for searching the image data stored in said storing means, means for displaying an image corresponding to the searched image data, and electronic computer means for sending and receiving commands and data and for outputting video signals asynchronously with the image filing system, said method comprising the steps of:

converting said video signals provided from said electronic computer means into digital video signals suitable to be displayed on the displaying means, said digital video signals being synchronized with a fundamental clock of said display means;

temporally storing said digital video signals;

enlarging an image represented by said digital video signals in response to said data sent from said electronic computer means; and synthesizing said digital video signals of said enlarged image and the searched image data prior to display of said digital video signals by said display means.

16. The method according to claim 15, wherein in said synchronizing step, said digital video signals and the searched image data are operated on in response to the commands sent from said electronic computer means.

17. An electronic image filing system according to claim 1, wherein said synthesizing means includes operation means for operating on said digital video signals of said enlarged image and said searched image date obtained by said searching means.

18. An electronic image filing system according to claim 4, wherein said synthesizing means includes operation means for operating on said digital video signals corresponding to said enlarged image and said image data corresponding to said image obtained by said searching means.

19. An electronic image filing system according to claim 7, wherein said synthesizing means includes operation means for operating on said digital video signals of said enlarged image and the searched image data supplied from the searching means.

20. An electronic image filing system according to claim 10, wherein said synthesizing means includes operational means for operating on said digital video signals of said enlarged image supplied from said enlarging means and the searched image data supplied from the searching means.

21. An electronic image filing system comprising:

an electronic computer provided with a data port for sending and receiving commands and data as well as a video port for outputting video signals; and an image processing device connected to said electronic computer through said data port and said video port, which includes storing means for storing image data, searching means for searching said image data stored in said storing means in response to said commands and data sent through said data port from said electronic computer to obtain one of said image data;

converting means for converting video signals asynchronously supplied through said video port from said electronic computer into digital video signals in synchronous with the fundamental clock of said image processing device, synthesizing means responsive to said searching means and said converting means, for enlarging an image represented by said digital video signals, and for synthesizing said digital video signals of said enlarged image and said image data supplied from said searching means, and displaying means for displaying a synthesized image corresponding to an output of said synthesizing means.

22. A method for synthesizing an image in an electronic image filing system including means for storing image data, means for searching the image data stored in said storing means, means for displaying an image corresponding to the searched image data, and electronic computer means for sending and receiving commands and data and for outputting video signals to the image filing system, and method comprising the steps of:

converting said video signals asynchronously provided from said electronic computer means into digital video signals suitable to be displayed on the displaying means, said digital video signals being synchronized with the fundamental clock of the displaying means;

enlarging an image represented by said digital video signals in response to said data sent from the electronic computer means; and synthesizing said digital video signals of said enlarged image and the searched image data prior to display of said digital video signals by said displaying means.

* * * * *